Sept. 13, 1966  A. F. MERGEN  3,272,569
PNEUMATIC LOADING BEARING ARRANGEMENT
Filed Aug. 28, 1963  2 Sheets-Sheet 1
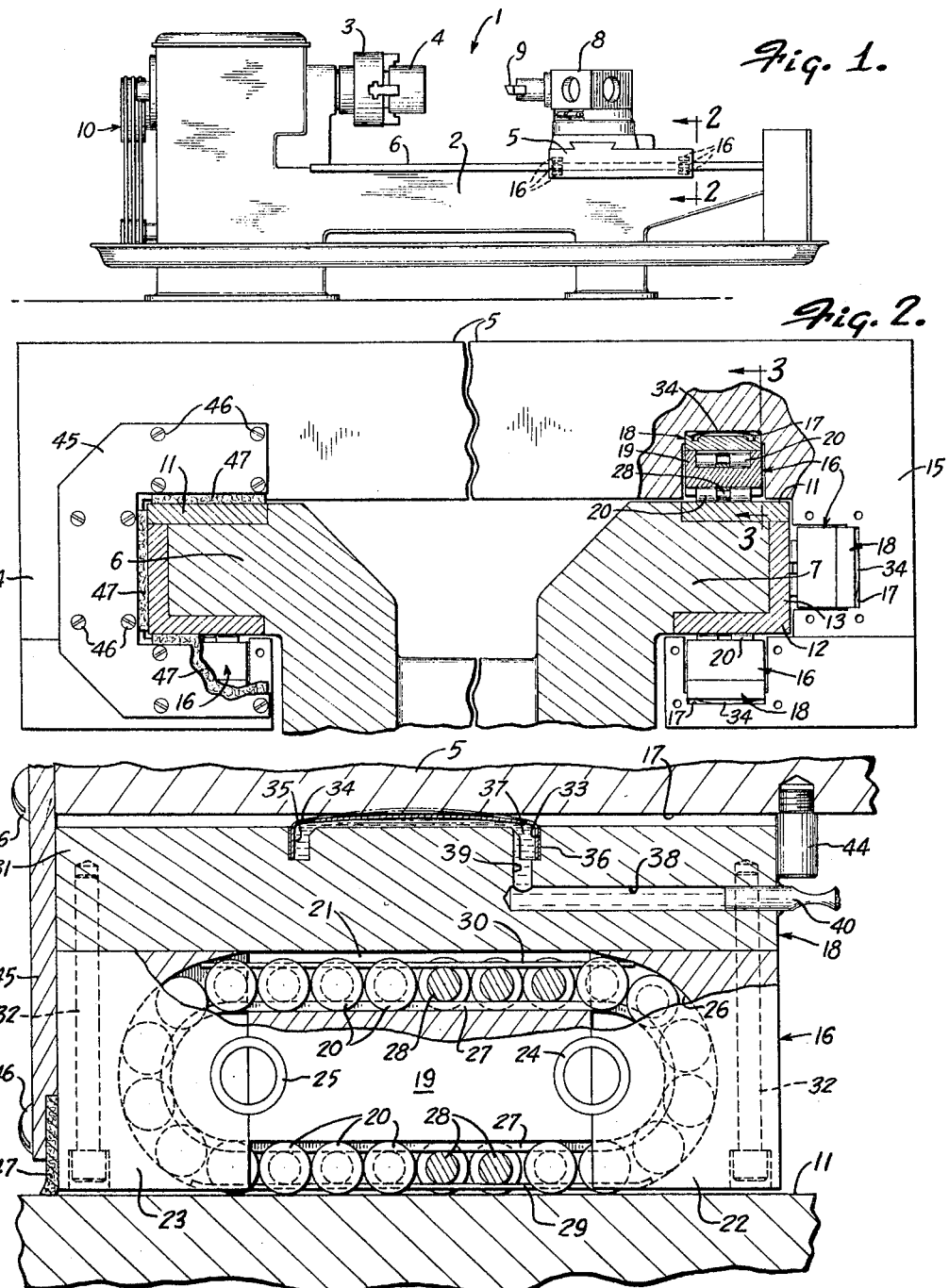
INVENTOR.
ALFRED F. MERGEN
BY
Andrus & Starke
ATTORNEYS

United States Patent Office 3,272,569
Patented Sept. 13, 1966

3,272,569
PNEUMATIC LOADING BEARING
ARRANGEMENT
Alfred F. Mergen, Sun Prairie, Wis., assignor to Gisholt Corp., a corporation of Wisconsin
Filed Aug. 28, 1963, Ser. No. 305,139
5 Claims. (Cl. 308—6)

This invention relates to a loading device and particularly to a new and novel loading device which has the characteristic of a spring of variable stiffness and is particularly adapted as a misaligning compensating mounting unit for a movable member such as the tool carriage of a lathe or the like.

In the manufacture of machine tools and the like, it is often desirable to mount the relatively movable member with a spring device in a manner to compensate for manufacturing and assembling tolerance. A particularly severe problem is presented with the increased pressures and cutting speeds employed with cutting machines such as lathes and the like. Thus, in a lathe, a tool carriage may be movably supported on a pair of longitudinal ways forming a part of the supporting bed. The carriage is moved toward the workpiece at a predetermined speed to feed the cutting tool into the work. Either the work or the tool may be turned at a predetermined speed to effect a predetermined removal of the material. Substantial forces are transmitted through the tool and moving member onto the supporting bed. Generally, it has been found advisable to support the movable member by suitable anti-friction bearing members having recirculating rollers to provide minimal amounts of friction. However, the higher tool pressure loads cause even the stiffest carriage members to deflect somewhat and result in a change in the parallel relationship between the tool surfaces contacting the roller members. Even minute lack of parallelism may cause skewing of the rollers and concentration of the load on the ends of the roller. When this occurs, the life of the rollers is substantially reduced. Further, movement of the carriage in the several supporting planes may create a substantial relaxation or movement of one wall of the carriage from the supporting wall even though the opposing movements are rather small. Thus, the mounting should preferably compensate for such movement while maintaining a positive support of the carriage.

In summary, present tool loading must consider the stiffness and dimensional stability of the system and must provide a mounting system which maintains the forces perpendicular to the supporting surface to provide rigidity in a direction normal to the mating or sliding forces.

In accordance with the present invention, a loading device is provided which functions as a spring device to maintain precise alignment or transmission of the forces in a perpendicular direction and providing a variable stiffness control to provide ease of assembly, compensation for manufacturing tolerances and substantial relaxation without loss of support while providing a sufficient stiffness to carry the heavy loads encountered in machine tools or any other suitable system.

In accordance with the present invention, a relatively incompressible flowable material, such as liquid and particularly water because of its high bulk modulus, soft solid rubbers and similar materials may be used. Thus, the material selected has the characteristics of changing its shape readily under initial loading but being essentially incompressible such that slight changes in volume are provided at heavy loading. The material is confined within a chamber having a support wall and a loading wall which is subjected to a changing load. The loading wall is movable relative to the flowable material and is arranged sequentially to deform the material into a total confined configuration preventing further deformation under initially loading and thereafter, under heavy loading, to compress the material. The material being a liquid or some solid having a similar characteristic permits relatively large movement during the initial loading and thus functions as a soft spring until approaching the totally minimum confined state. Thereafter, the compression characteristic of the liquid or other material produces small deflection with large loads. Water or other suitable material confined solidly on all sides except for a thin metallic diaphragm providing a supporting or loading surface provides a useful spring device including misalignment compensation. The fluid stretches or deflects the diaphragm outwardly to form a crowned or curved supporting surface. A particularly satisfactory structure constructed in accordance with the invention employs a metallic block having an annular recess or cavity. A generally thin cup-shaped diaphragm of metal having a planar face is fitted over the cavity with the side wall of the disc engaging the outer annular wall of the cavity and preferably soft soldered or otherwise secured thereto. The cavity is then filled with water or other material having the characteristic of water under pressure until a desired outward deflection of the diaphragm is obtained, with a generally crowned configuration providing an unsupported peripheral portion when a planar loading member is applied to the diaphragm. Forces applied to the diaphragm face by a load member are transmitted to a supporting member through the confined fluid. Further, the forces are similarly transmitted even though the line of force of the load is not perpendicular to the supporting surface, apparently as a result of the flexibility of the diaphragm as more fully discussed hereinafter. The device has the characteristics of a very stiff spring the free length of which depends upon the volume of the confined fluid with the spring constant increasing inversely with the quantity of the fluid confined.

The present invention thus provides a variable spring which can be readily applied to compensate for assembly tolerances, to adjust the preloading of rolling elements as well as other uses requiring a spring device of this character.

As applied to a lathe or similar machine tool, the carriage may be provided with supporting recesses each having a roller bearing supported for riding upon a corresponding way of the bed. A spring or load cell of the present invention is mounted between the back side of the roller bearing and the recess to transmit the load forces to the roller in a direction normal to the bed way and roller even if the carriage member deflects with respect to the bed about either of the two axes perpendicular to each other and to the line of the normal force at the way. By employing a small quantity of suitably confined material, the load cell under the normal working forces has the characteristic of very stiff spring and thus is very rigid in the direction of the normal force. However, under low initial preloads and the like, the cell acts as a soft spring allowing ready assembly and further allowing substantial deflection when surfaces are separated to maintain a positive holding and support of the roller bearing.

The structure of the present invention employs a minimal number of components, all of which are readily manufactured, and therefore can be made at reasonable cost.

The drawing furnished herewith illustrates the best mode presently contemplated for carrying out the invention.

In the drawing:

FIG. 1 is a front elevational view of a turret lathe;

FIG. 2 is an enlarged vertical fragmentary section taken on line 2—2 of FIG. 1;

FIG. 3 is an enlarged elevational view of the roller bearing unit taken generally along line 3—3 of FIG. 2;

Figure 4:
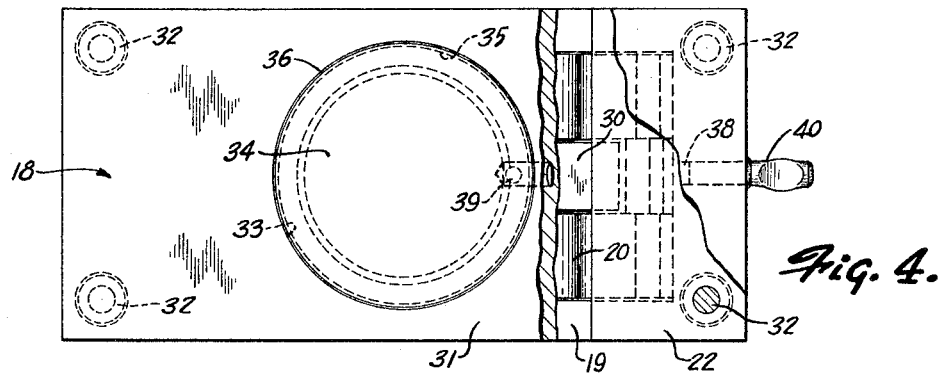
FIG. 4 is a top view of FIG. 3 with parts broken away and sectioned.

Referring to the drawing and particularly to FIG. 1, a turret lathe 1 is shown having a supporting bed 2. A chuck 3 is provided at one end of the lathe 1 to support a workpiece 4 overlying the bed 2. An adjustable carriage 5 is supported on a pair of longitudinal ways 6 and 7 extending rearwardly the length of the bed from the chuck 3. A tool turret 8 is rigidly fixed to the carriage 5 and supports one or more tools 9 for movement toward and away from the workpiece 4. A rotating drive 10 is coupled to the chuck 3 in any suitable manner, not shown, to rotate the workpiece 4 while the carriage 5 is moved to establish a predetermined cutting engagement of the tool 9 with the rotating workpiece 4, in accordance with known practice.

Referring particularly to FIGS. 1 and 2, the bed 2 is generally provided with a U-shaped upper portion having outwardly and laterally extending rectangular guides or ways 6 and 7, each of which includes an upper supporting way 11, a lower supporting way 12 and a vertical or side supporting way 13. The carriage 5 is generally an inverted V-shaped member defining depending arms or side portions 14 and 15 aligned respectively with the supporting ways 6 and 7 and having complementing passageways mating with ways 6 and 7. The front and back portions of the carriage 5 are similarly supported by a plurality of similar roller bearings 16 secured within suitable cavities 17 in the arm portions 14 and 15 to move with carriage 5 in rolling engagement with the respective ways 11 through 13, inclusive. A load cell 18, constructed in accordance with the present invention, is secured to each of the bearings 16 and engages the base of the corresponding cavity 17 to provide an improved preloaded mounting and novel transmission of forces through the bearings 16 to the supporting ways 11–13 forming the outer surfaces of longitudinal ways 6 and 7. Although shown applied to ways having a rectangular cross section, the invention can be employed with those of generally V-shaped cross section wherein even more severe movement may be encountered. The present illustration is given to clearly show the construction and operation.

Each of the roller bearings 16 and the related load cell 18 is similar in construction and a single one of the assemblies is shown in detail hereinafter in FIGS. 3 and 4 to clearly illustrate the present invention.

Referring particularly to FIGS. 2 and 3, the illustrated roller bearing 16 is a recirculating anti-friction roller bearing of a known construction. In the illustrated embodiment of the invention, the unit includes a rectangular block roller race 19 having a plurality of center guided rollers 20 mounted for continuous longitudinal recirculation about the race and defining a planar roller supporting surface including a plurality of the rollers. The opposite surface of the race 19 is recessed to form a return channel 21 for the rollers 20 with the roller below the corresponding race surface which defines a planar mounting surface. Channel 21 is aligned with end return recesses formed in end caps 22 and 23 secured to the respective opposite ends of the race 19 in any suitable manner shown as annular or ring clips 24 and 25 driven into suitable and corresponding milled openings in the abutting ends of race 19 and caps 22 and 23. Each cap 22 and 23 includes an inner half moon recess as at 26 to accommodate the rollers and an encircling guide strip 27 is secured about the race to guide the rollers as follows.

Each roller 20 is centrally recessed as at 28 and mates with the guide strip 27 and with guide rails 29 and 30 which are secured to the opposite sides of race 19 extending longitudinally between the end caps 22 and 23.

The rollers 20 continuously roll on the corresponding support surface or ways 11–13, inclusive, and transmit the forces applied to the bearing to correspond ways 6 and 7. Roller bearings of this variety provide very low friction and long accuracy life in normal usage. However, tool pressures transmitted to the carriage 5 can cause slight deflection of the carriage with respect to the longitudinal ways 6 and 7 and destroy the parallel relationship between the bearing surface of the carriage 5 and the corresponding bed supporting ways 11–13. Even rather minute lack of parallelism may cause the rollers to skew and prevent free rolling thereof or concentrate the load on the end of a roller 20 with a resulting rapid and complete destruction of the roller at that point.

The load cell 18 of the present invention compensates for misalignment of the carriage 5 and maintains proper force transmission as well as facilitating assembly and compensating for assembly tolerances.

As shown in FIGS. 2–5, inclusive, the illustrated load cell 18 includes a rectangular block body 31 generally corresponding to the outer configuration of the bearing 16. The block body 31 is secured to the back side of the bearing 16 by a plurality of cap bolts 32 which project through openings in the end caps 22 and 23 and thread into correspondingly tapped openings the block body 31 to form an interconnected unit for ease of assembly and the like. The outer surface of the cell body 31 is provided with an annular cavity 33, generally centrally thereof. A cup-shaped metal diaphragm 34 is secured overlying the cavity 33 and includes a depending lip or edge 35 brazed, soft soldered or otherwise sealed to the outer annular wall defining the cavity 33 as at 36. Diaphragm 34 is formed of suitable elastic material such as an elastic steel or other durable material. Water or other similarly relatively incompressible material 37 completely fills the cavity 33 under pressure.

Although the material 37 employed may vary with the application, the material must be capable of changing its geometry or shape under relatively low loads to a totally confined configuration and thereafter have generally minimal changes in volumes for increasing loads. Generally, gas-free liquids will provide extremely satisfactory results although solid soft rubbers of a natural or synthetic character as well as similar material which can be readily deformed may also be employed. The compressibility of the flowable material is given by the bulk modulus and this is preferably as large as the material available. Thus, water has bulk modulus of about 300,000 p.s.i. (pounds per square inch) for maximum density and has been found to provide excellent results as hereinafter described. Where freezing conditions may be encountered, glycerine or other similar antifreeze is preferably employed. Glycerine has substantially the same bulk modulus as water and therefore provides a completely compatible mixture.

Although the water 37 may be introduced into the cavity 33 of cell 18 in any desired manner, optimum results are obtained if all or substantially all of the dissolved air or other gases are removed. In the absence of any load on the diaphragm 34, it is stretched or deflected outwardly from the normal position, shown in dotted outline in FIG. 3 as a normal planar face adjacent the face of body 31 by the fluid pressure to provide a crowned or generally curved supporting and loaded surface. Under load, the fluid 37 is first deformed and then compressed to sequentially provide a soft and stiff spring action as more fully discussed hereinafter.

In the illustrated embodiment of the invention, cavity 33 is filled through a lateral filling opening or passage 38 which extends inwardly from one end edge of the body 31 with a perpendicular and generally short axial passage 39 interconnecting the cavity 33 to the opening 38. The passage 38 is sealed by pinched filling tube 40 having the outer end filled with solder or the like.

In assembly, the load cell 18 is constructed to provide a predetermined quantity of confined water 37 or other suitable liquid or similarly deformable material and a predetermined deflection and crowning of the metal diaphragm 34 in accordance with the distance between the base of the carriage recess 17 and the adjacent corresponding supporting ways 11–13, inclusive, of the bed 2. The load cell 18 is assembled with the roller bearing 16 and clamped or inserted in the recess 17.

A locating pin 44 which projects into recess 17 from the base thereof locates the assembled bearing 16 and load cell 18 with the opposite face in the plane of the end of carriage 5. A U-shaped retaining plate 45 is secured to the end faces of carriage 5 as by screws 46 to lock the respective bearings 16 and load cells 18 within the recesses 17 for movement with carriage 5. Suitable wiper pads 47 are shown clamped in place by plates 45 in wiping engagement with the ways 11–13 of ways 6 and 7.

During the initial assembly, the diaphragm 34 has the characteristic as a relatively weak spring which is more or less readily deflected to permit relatively simple and quick assembly of the unit. Further, as the load increases, the pressure of the confined water 37 increases to support the increased load. The brazed or soldered joint 36 between the diaphragm 34 and wall of cavity 33 retains the substantial internal pressures, apparently because it functions only as a seal with only minimal shear stresses.

In the assembled relation and after initial loading, the confined material 37 is deflected to the position of FIG. 3 such that subsequent closing of the gap compresses the material 37 and causes the load cell 18 to function as a very stiff spring in transmitting forces from the carriage 5 to the bearing 16 and then to the corresponding way 6 or 7. This mounting provides the required extreme rigidity in the direction normal to the parallel force surfaces of carriage 5 and the ways 6 and 7.

The diaphragm 34 in the assembled or loaded position as shown in FIG. 3 includes an unsupported peripheral area and provides a support generally similar to the support provided by a spherical member. Further, if the support or load transmitting surface of the carriage tilts, the diaphragm and material are elastically deformed to accommodate the movement with the forces transmitted normal to the way surface. Thus, the carriage 5 and particularly the face of recess 17 may deflect, under tool loads or the like, about either or both of the two perpendiculars in a plane normal to the line of force. As a result, the parallelism between the supporting walls or surfaces of ways 6 or 7 and the carriage surfaces is destroyed. However, the diaphragm 34 of the present invention allows the carriage 5 to deflect while maintaining the normal transmission of forces on the bearing 16 and thus compensate for any misalignment.

Analysis of the present invention was in part explored with a steel diaphragm which was .010 inch thick and 1⅜ inches in diameter. The planar face of the diaphragm initially was adjacent the face of the block body and was expanded to .020 inch at the center with water pressure at twelve pounds per square inch. The device was then placed in a test fixture and loaded through a fixture loading plate in increments from 250 pounds up to a maximum of 6,000 pounds, as hereinafter tabulated. The deflection of the diaphragm and the pressure at the respective loadings are shown by the deflection curve 48 of FIG. 5 which gives the spring characteristic.

Figure 5:
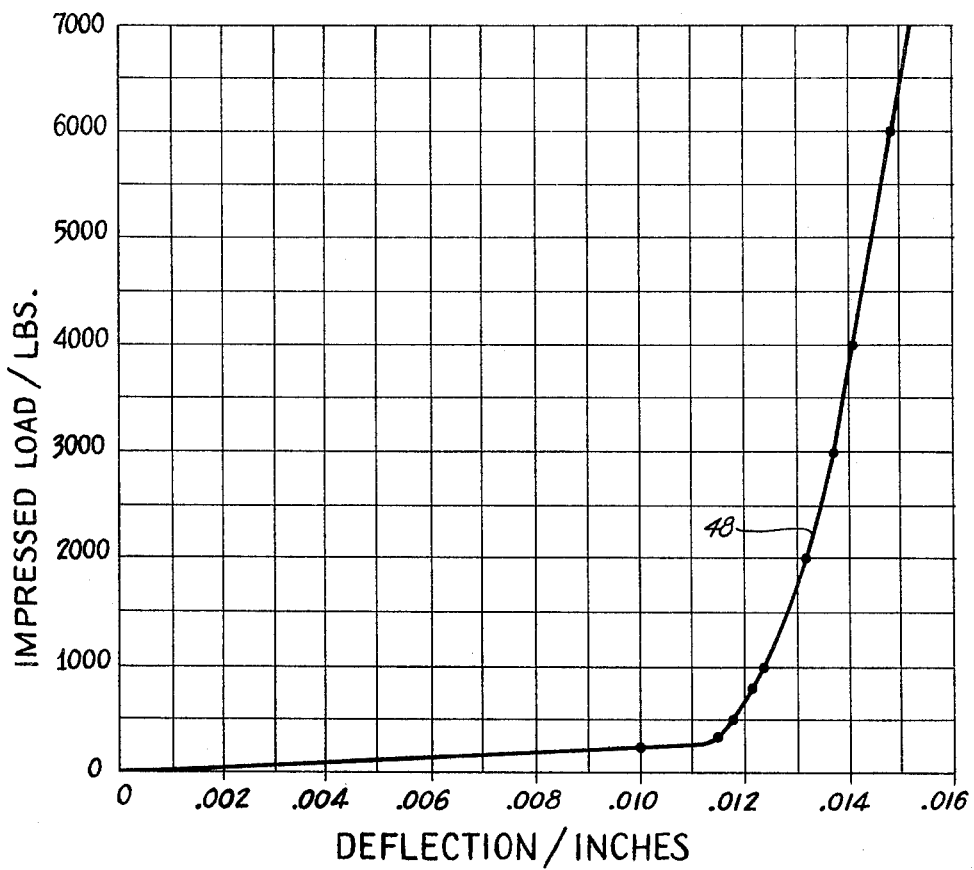
FIG. 5 is a load curve showing the characteristics of a device constructed in accordance with the present invention.

During the initial loading, the deformation of the diaphragm and liquid provides essentially the complete contribution to the curve and produces a relatively soft spring characteristic, providing substantial deflection with a corresponding small load change as shown in FIG. 5 generally indicating a low spring constant. Although there is probably some compression effect, it appears insignificant. However, as the load increases, the geometry of the device is changed to substantially prevent further deformation of the system during subsequent loading, the compression characteristic of the liquid provides essentially the complete contribution to the curve and produces a relatively heavy spring characteristic having a constant of the order $10^6$, indicated by the sharp increase in the rise of curve 48. The curve includes a knee area or curved junction which is not precisely defined but is noticeably distinct at which both factors contribute. Practically, the curve to either side of the knee area is also curved slightly but to such a small extent that it can be assumed to be straight. Thus, the exact shape of the curve will vary with the filler material employed and the precise geometry but will produce the same general dual spring characteristic. Thus, the bearings need only be preloaded to a small load such as adjacent the beginning of the stiff spring portion of the cell and allow additional working or tool loads of a substantial magnitude on one cell without danger of removing a holding position load from another cell.

Generally, it appears that the material should have a compressive modulus of elasticity which is a measure of the stiffness of the material under compressing loading of less than 50,000 pounds per square inch. The compressive modulus of elasticity is defined by the equation $$E = \frac{1}{A} \frac{P}{\delta}$$

where 1 is the original depth or length in the direction of force application, P is the force or load, A is the area and $\delta$ is the deflection resulting from the load.

The self-aligning feature of the invention was investigated by mounting the loading plate with freedom to rock slightly and deflection on opposite sides of center were read. The difference of the two readings indicates the misalignment compensation and the average thereof is the diaphragm deflection. The several readings recorded were as follows:

| Load Lb. | Deflections, Inches | | | |
| --- | --- | --- | --- | --- |
| | Left | Right | Diff. | Avg. |
| 250 | .0111 | .0109 | .0001 | .01000 |
| 350 | .0115 | .0114 | .0001 | .01145 |
| 500 | .0118 | .0118 | 0 | .01180 |
| 750 | .0123 | .0122 | .0001 | .01225 |
| 1,000 | .0126 | .0124 | .0002 | .01250 |
| 2,000 | .0132 | .0131 | .0001 | .01315 |
| 3,000 | .0133 | .0140 | .0007 | .01365 |
| 4,000 | .0131 | .0150 | .0019 | .01405 |
| 6,000 | .0129 | .0167 | .0039 | .01485 |

The misalignment compensation varied from .0001 inch to .0039 indicating that the device is relatively flexible and functions to provide misalignment compensation.

An adjustable volume control means may be provided for varying the volume of the confined liquid and thereby adjusting the spring constant of the unit. During a cutting operation of a machine tool, a very stiff spring could be provided for carrying the heavy loads. During other periods, the stiffness of the spring could be substantially reduced to thereby reduce the frictional forces and the wear while moving of the relative parts.

Passage 38 could be extended through the base and closed by an adjustable steel plunger to allow varying of the volume of the water confining chamber.

Plunger adjustment would vary the loading of the carriage mounting to reduce the frictional forces between the bed and the supported carriage during a retraction of the carriage. During a cutting operation, the fluid would be confined to a somewhat smaller volume to thereby increase the stiffness characteristic of the cell to compensate and support the heavy tool loads while maintaining the misalignment compensation feature.

Although particularly described with respect to the mounting of a lathe carriage, the device can obviously be employed in any other similar mounting system where compensation is necessary and desired. As previously noted, the device of this invention is essentially a spring having a variable constant which can be controlled by the confined fluid volume as well as the geometry of the device. Thus, a thin flexible ball filled with liquid and disposed in a confining cavity, square, cylindrical or other suitable shape, might be provided with a plunger member acting upon the ball. During the initial loading, the ball will deform to the configuration of the cavity to provide a soft spring action and thereafter the confined fluid is compressed to provide the heavy spring action. Certain soft rubbers and the like will also function in the same manner and may eliminate the requirement for the separate flexible diaphragm. The spring or load cell may be employed in any suitable application employing a spring support or loading. For example, the apparatus could be employed as a brake with the diaphragm surface being expanded and contracted through a variable pressure or fluid source to alternately establish minimal and high friction loading.

The present invention thus provides a relatively simple and improved method of providing a variable or adjustable preloading member and is particularly adapted to supporting objects requiring misalignment compensation.

Various modes of carrying out the invention are contemplated as being within the scope of the following claims particularly pointing out and distinctly claiming the subject matter which is regarded as the invention.

I claim:
1. A spring loaded rolling mounting assembly, comprising:
 (a) a fixed support member having a planar supporting wall,
 (b) a movable member having a planar wall,
 (c) a recirculating roller bearing having a body with a back mounting wall and a plurality of recirculating cylindrical rollers defining a planar rolling surface opposite the back mounting wall, said bearing being disposed on the fixed supported member with the rollers on the planar supporting wall,
 (d) a spring unit disposed between the movable member and the roller bearing and including a first portion with a first spring constant deflectable under initial loading and a second spring portion of a substantially higher spring constant deflectable after substantially complete deflection of the first spring portion, and
 (e) said spring unit having a crowned force transmitting surface establishing self-alignment of the load forces on the movable members to establish perpendicular forces on the spring unit and roller bearing.

2. A roller-spring unit comprising,
 (a) a roller bearing having a planar rolling surface and an opposite parallel planar mounting surface,
 (b) a supporting body secured to the mounting surface having a cavity in the opposite body surface,
 (c) an elastic diaphragm secured to the body overlying said cavity and defining a spring control chamber therewith, said diaphragm constituting a load receiving surface for supporting a member on the roller bearing, and
 (d) an essentially incompressible material confined within said chamber under a pressure expanding said diaphragm, said material being compressed in response to loads applied to said diaphragm.

3. A roller mounting assembly, comprising,
 (a) a metal block having opposite outer parallel planar faces one of which includes an annular cavity,
 (b) an elastic diaphragm having an annular lip sealed to the radially outer wall of said cavity and a planar face adjacent the corresponding planar face of the block,
 (c) liquid confined under pressure within said cavity and of sufficient volume to elastically deflect the planar face of the diaphragm outwardly to provide a crowned load supporting surface,
 (d) a roller bearing having a planar mounting surface and a series of supporting rollers defining a planar supporting rolling surface opposite said planar mounting surface, and
 (e) attachment means to secure said roller bearing to said metal block with said planar mounting surface abutting the planar face of the block opposite the face with the cavity.

4. A mounting assembly, comprising,
 (a) a fixed support member and having a planar supporting wall,
 (b) a recirculating roller bearing unit having a planar mounting wall and having a plurality of recirculating cylindrical rollers defining a parallel planar rolling surface opposite the mounting wall,
 (c) a load cell secured to the mounting surface of the bearing unit and having an annular cavity on the outer surface with an elastic metallic diaphragm secured in overlying relationship to define a control chamber, a predetermined volume of liquid confined within the control chamber and deflecting said diaphragm outwardly to a crowned configuration,
 (d) a movable member having a planar load transmitting wall, and
 (e) means to secure said bearing unit and load cell to the movable member with the roller surface engaging said supporting wall of the fixed support member in supporting relation and the diaphragm engaging the load transmitting wall of the movable member in load supporting relation, said movable member being free to rock on said diaphragm and said diaphragm deflecting under loading of the movable member and transmitting the load through the confined water to the bearing unit and the fixed support member with the forces being normal to the supporting wall of the fixed support member.

5. A mounting assembly, comprising,
 (a) a fixed support member having a planar supporting wall,
 (b) a movable member having a planar wall,
 (c) a recirculating roller bearing having a planar mounting wall and a plurality of recirculating cylindrical rollers defining a parallel planar rolling surface opposite the mounting wall,
 (d) a load cell having a planar wall secured to the mounting surface of the bearing and having an annular cavity on the wall opposite said planar wall of the cell, a flexible metallic diaphragm secured overlying said cavity and defining a control chamber therewith, and a predetermined volume of water confined within the control chamber and forcing said diaphragm outwardly to a crowned configuration, and
 (e) means to interpose said bearing unit and load cell between the members with the rolling surface engaging said supporting wall of the fixed support member and the diaphragm engaging the planar wall of the movable member, said diaphragm deflecting under loading of the movable member and transmitting the load through the confined fluid to the bearing and the fixed support member with the forces being normal to the supporting wall of the fixed member.

References Cited by the Examiner

UNITED STATES PATENTS

| | | | |
|---|---|---|---|
| 1,893,858 | 1/1933 | Carlson | 177—208 X |
| 2,592,009 | 4/1952 | Clement | 177—208 X |
| 2,866,655 | 12/1958 | Stanbro | 277—88 X |
| 3,191,701 | 6/1965 | Gray | 177—209 |

FOREIGN PATENTS

| | | |
|---|---|---|
| 231,116 | 3/1925 | Great Britain. |
| 802,579 | 10/1958 | Great Britain. |

DAVID J. WILLIAMOWSKY, *Primary Examiner.*

L. L. JOHNSON, *Assistant Examiner.*